COMMUNICATION SYSTEM

Filed Aug. 15, 1966 6 Sheets-Sheet 1

INVENTORS
ROBERT H. RUGABER
EUGENE W. YURGEALITIS
BY Anthony D. Cennamo
ATTORNEY

COMMUNICATION SYSTEM

Filed Aug. 15, 1966 6 Sheets-Sheet 2

INVENTORS
ROBERT H. RUGABER
EUGENE W. YURGEALITIS
BY Anthony D. Cennamo
ATTORNEY April 21, 1970 R. H. RUGABER ET AL 3,507,980

COMMUNICATION SYSTEM

Filed Aug. 15, 1966 6 Sheets-Sheet 3

INVENTORS
ROBERT H. RUGABER
EUGENE W. YURGEALITIS
BY Anthony D. Cennamo

ATTORNEY

INVENTORS
ROBERT H. RUGABER
EUGENE W. YURGEALITIS
BY Anthony D. Cennamo
ATTORNEY INVENTORS
ROBERT H. RUGABER
EUGENE W. YURGEALITIS
BY Anthony D. Cennamo
ATTORNEY INVENTORS
ROBERT H. RUGABER
EUGENE W. YURGEALITIS
BY Anthony D. Cennamo
ATTORNEY United States Patent Office 3,507,980

Patented Apr. 21, 1970

3,507,980

COMMUNICATION SYSTEM

Robert H. Rugaber, Pittsford, and Eugene W. Yurgealitis, Webster, N.Y., assignors to Xerox Corporation, Rochester, N.Y., a corporation of New York Filed Aug. 15, 1966, Ser. No. 572,596
Int. Cl. H04n 1/44
U.S. Cl. 178—5.1 5 Claims

ABSTRACT OF THE DISCLOSURE

A logical interface apparatus for facilitating mode selection in a combined voice-graphic communication system operable over secure telephone channels. The output of a facsimile transceiver is amplitude and time quantized to generate a two level, digital signal prior to the coupling thereof to an encrypting apparatus at the transmitting terminal of the secure telephone line. After decoding at the receiving terminal, the two level video signal train in the graphics mode is employed to control the selective actuation of the marking apparatus of the facsimile transceiver. Further, a graphic mode loop check is included wherein the generation of a reverse supervisory signal on the transmission channel controls the initiation and duration of the graphic transmission mode.

This invention relates to communications systems and more particularly to improved combined voice and graphic communications apparatus operable over telephone facilities.

In many aspects of business and government it is often desirable to rapidly and economically transmit graphic information as well as voice communications between one or more remote points and a central point. For example, in the business community it is often advantageous for a salesman to be able to efficiently and economically transmit orders to a central office for acceptance and/or fulfillment. Additionally, in the newspaper business it is often desirable for reporters to be able to quickly and completely dispatch graphic information to the main office for processing. The use of two-way radios and telephones although extremely advantageous in obtaining rapid voice communications have not offered a complete solution for the transmission of graphic information for unaided they are unable to transmit graphic information effectively.

In addition to the desirability of rapid and economic transmission of graphic and voice communications it is often desirable in the government and business worlds to transmit information in a secure manner. By employing cryptographic techniques the sender and receiver are insured that the information will not be intercepted by unauthorized personnel. By employing secure or cryptographic techniques the content of a message to be transmitted over normal channels may remain a secret and not fall into unauthorized hands.

Facsimile systems are well known in the art in which a transmitter converts information on a document through, for example, an electro-optical scanning system into electrical signals suitable for transmission over wire or radio communication networks. At the facsimile receiver the electrical signals in conjunction with suitable synchronizing signals control the marking apparatus which in response to received electrical signals recreates a copy or facsimile of the original document.

Similarly secure telephone communication lines are well known particularly in government circles in which the voice or audio signals are encrypted or scrambled prior to their transmission over normal phone channels and decrypted or unscrambled at the receiving end. In this manner a secure voice system may be employed by scrambling or encrypting the message before transmission over the voice channel and a similar decoding at the receiving station. In this manner the audio or voice signals are altered sufficiently prior to transmission to preclude unauthorized interception while the authorized or properly equipped receiver hears in real time the communication to be sent.

With the advent of mass communications networks including vast globe encircling satellites and transoceanic cable telephone networks it is possible to establish telephone communication circuits between nearly any two cities in the world. Thus, when employing either a secure telephone apparatus or a facsimile apparatus of the type hereinbefore described it is possible to establish communications between nearly any two cities in the world. While it is possible to operate such secure telephone networks and facsimile systems independent over parallel channels it is often desirable to transmit a combination of voice and graphic communications over a single channel. Further it is desirable to selectively connect either a secure phone or a secure facsimile system over a single channel at the operator's command.

It is therefore an object of the present invention to provide methods and apparatus for selectively operating a secure communication channel in either a voice or a graphic mode.

It is a further object of the present invention to increase the compatibility of land line facsimile apparatus and land line voice telephone apparatus over a single telephone line channel.

It is a further object of the present invention to provide methods and apparatus for operating a facsimile system in a secure telecommunication mode.

It is yet another object of the present invention to improve graphic communications over land line telephone circuits.

It is still a further object of the present invention to expand the usability of secure telephone lines for transmission of facsimile signals.

In accomplishing the above objects and other desirable aspects applicants' have invented a novel method and improved switching apparatus for selectively controlling the coupling of telephone and facsimile apparatus over a secure telephone communication channel. In accordance with the preferred embodiment of one aspect of the present invention, logical interface apparatus is provided for selectively switching terminal apparatus at the transmitter and receiver stations respectively from a voice to graphic transmission mode. Further logical interlock control signals generated at the receiver control the initiation of the graphic mode at the transmitter station thus ensuring the communication loop is ready for the initiation of graphic transmission. Security apparatus including encoding or scrambling apparatus and decoding apparatus at the transmitter and receiving stations respectively is arranged to be selectively coupled to the phone or facsimile apparatus by operator controlled switching apparatus.

For a more complete understanding of applicant's invention reference may be had to the following detailed description in conjunction with the drawings in which.

Figure 1:
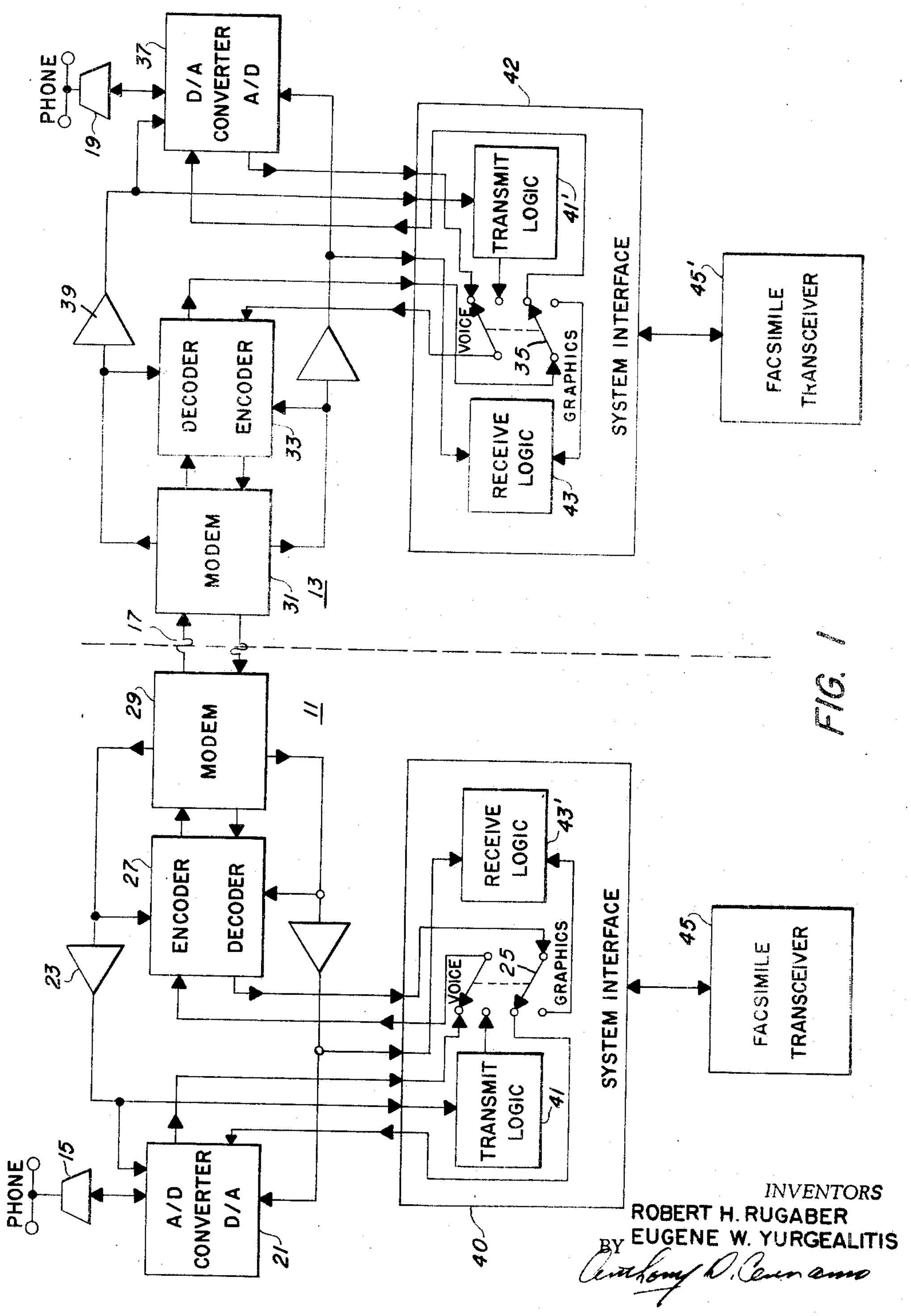
FIG. 1 is a block diagram of a combined voice and graphic communication network in accordance with the principles of the present invention.

Referring now to FIG. 1 there is shown a system block diagram of a voice-graphic secure communications system according to the principles of the present invention.

While the system is described in conjunction with a secure telephone link obviously any number of communications links including normal telephone circuits are also utilizable. Whether the system is simplex or duplex will depend upon the communication link capabilities and the associated terminal apparatus.

Referring first to the voice mode, the respective parties at the transmitting and receiving stations 11 and 13 establish voice connections in the normal manner. Thus after dialing the appropriate exchange and unit digits the transmitting telephone 15 is coupled via appropriate switching apparatus which forms a portion of the overall communication link 17 to the receiving telephone 19. In this secure system the normal electrical signals generated in response to the sound waves transduced in the mouthpiece of the telephone 15 are coupled to the input of converter 21. In converter 21 which may comprise an analog to digital converter, the signals are amplitude quantized. Additionally the signals after being amplitude quantizer are time quantized in accordance with the clock signals coupled via the isolation amplifier 23 to an input of converter 21. The output from converter 21 which now comprises an amplitude and time quantized signal corresponding to the analog voice signals is coupled via switch 25, in the position shown, to the input of the encoder circuit 27. The encrypter or encoding apparatus 27 may comprise any known means for mono or polyalphabetic substitution whereby group of the normal binary signals generated in response to the instantaneous input to the analog converter 21 are converted in some pre-determined cyclic order through various character patterns. The operation of the encrypter or scrambler 27 is controlled by clock signals generated or supplied by modem 29 at the transmitter terminal. After appropriate encryption in the encoder 27 the output signals are coupled via modem 29 to the input of the transmission line 17. The modem may comprise any appropriate terminal apparatus in which the signals are coupled to the input of the communication link after appropriate modifications in the signal frequency or power spectrum. In a typical apparatus the modem would convert the encrypted signal for transmission at a rate in the order of 2400 baud over a standard telephone channel.

At the receiving terminal or end of the communication link the signals are similarly applied to modem 31 which reconverts the signals from the format of the transmitted signal to the signal format similar to that applied to the modem input at the transmitter end. The output of the modem 31 is coupled to the input of the decrypting or decoding circuit 33 in which the reverse of the encoding operation performed at the transmitter is performed. Thus, in a mono or a polyalphabetic substitution encryption scheme, the received character would be decrypted by successive permutation in the reverse order of a similar code cycle. The operation of the decoder 33 is controlled in a manner similar to that of the transmitter by the clock supplied by the receiver modem 31. The output of the decrypter 33 is coupled via the switch 35 in the voice mode, as shown, to the input of converter or restorer circuit 37. Converter circuit 37 may comprise a digital-analog converter in which in the receiving mode an analog signal similar to that generated by the transducer of the mouthpiece of the telephone in response to the sound or voice signals to be transmitter over secure telephone system is generated. The output of the deconverter 37 is controller by the clock coupled via amplifier 39 from the modem 31. The signal from the deconverter 37 is coupled to the ear piece of the receiver telephone and there transduced to audio signals in the normal manner.

In accordance with one aspect of the present invention the secure system employed for the encryption and decryption of the normal voice mode is similarly employed to encrypt and decrypt facsimile signals to be transmitted over the channel. Multiposition switches 25 and 35 are employed at the respective transmit receive terminals for operator control of the mode selection. As shown in FIG. 1 switches 25 and 35 are in the voice mode. In the graphics mode the operators at the respective stations selectively position the switches in the graphics position thereby readying the apparatus for the graphics mode. As will hereinafter be more fully described a loop check procedure is initiated upon the operation selection of the graphics mode to prevent the inadventent sending of graphic material. In the graphic mode video signals from a facsimile transmitter generated in response to the scanning of a document for example by electro-optical scanning apparatus are coupled to the transmit logic 41 and thence via switch 25 to the input terminal of encoding apparatus 27. As in the voice mode the graphic data coupled to the input of encoder 27 is modified in accordance with a predetermined encoding rule and coupled to the input of modern 29. In the modem the encrypted signals are modified for compatibility with the transmission media and thence coupled to the input of the transmission channel. At the output of the transmission channel the signals are received by modem 31 and coupled to the input of decoder 33. As in the voice mode, the received data is coupled via the appropriate switch section of switch 35 to the input of receive logic 43 of the interface apparatus 42. In the receive logic 43 appropriate signals are generated to control the operation of facsimile transceiver 45 wherein a facsimile of the original document being transmitted is recreated at the receiving terminal.

Figure 2:
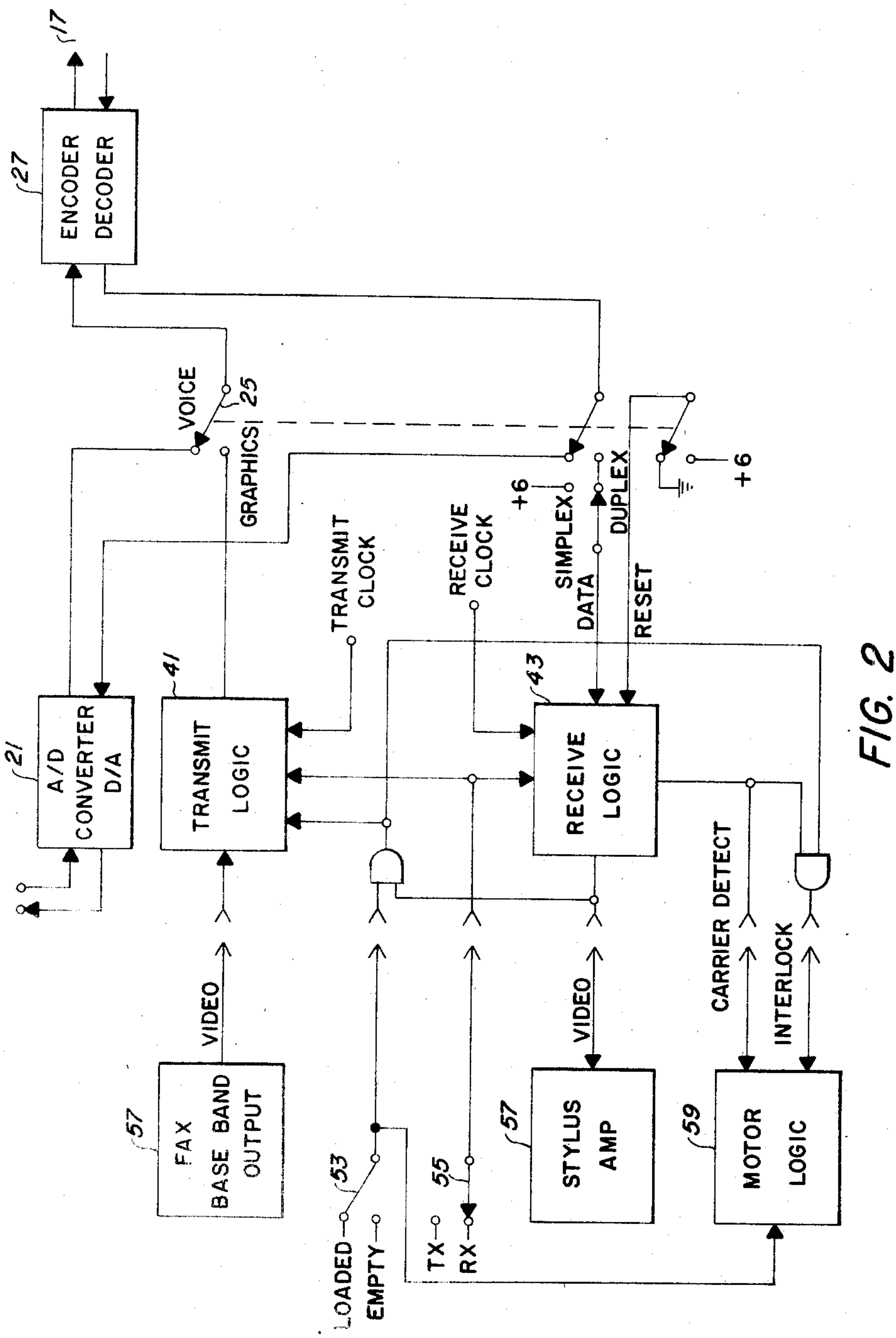
FIG. 2 is a logical block diagram of one terminal of the switching apparatus in accordance with the principles of the present invention.

Referring now to FIG. 2 there is shown a block diagram of one terminal of a secure dual mode communications link in accordance with the principles of the present invention. As shown the audio signals from a transmitting telephoen handset are coupled to the input om converter 21 and the output of the converter with the switch 25 in the position shown is coupled to the encoder 27. Similarly in the receiving mode the decrypted signals are coupled from the output of the decrypting portion of the secure apparatus 27 via the switch 25 in the positions shown to the input of the converter 21. In the receiving mode the converter would act as a deconverter thus generating appropriate signals for driving the speaker in the earpiece of the receiving telephone. As will hereinafter be more fully explained in the transmit mode, a loop check procedure insures that the respective facsimile transmitter and receiver are in the graphic mode. As shown a paper load switch 53 and a request to send-receive switch 55 must be properly positioned at the respective transmitter and receiver stations to enable the transmit and receive logic. With the graphic loop check procedure completed the transmit logic 41 is enabled to couple the video signal stream via the record or graphic section of the select switch 25 to the input of the encoder 27. Thereafter in the manner hereinbefore described the information signals are scrambled prior to coupling to the transmit end of the communication link and thereafter the decoded signals are coupled at the receiver to control the operation of the facsimile recorder.

While any facsimile apparatus may be adapted to perform in the combined secure voice-graphics mode in accordance with the principles of the present invention, the preferred embodiment of the interface control logic will be described in conjunction with signals generated by a Xerox-Magnafax Telecopier transceiver which is commercially marketed by Xerox Corporation. The terminals shown at FIG. 2 may function either as a transmitter or receiver with the Telecopier transceiver as the facsimile or graphic communication apparatus.

In the receive graphic mode, the data stream coupled after decryption or decoding from the decoding circuit 27 is applied via switch 25 to the input of the receiver logic 43. Similarly in the transmit graphic mode the video signals from video output 57 are coupled to the transmit logic 41. Initially a stop tone signal pattern is generated and transmitted. At the receiver station this signal pattern initiates a loop check procedure which conditions both the transmitter and receiver to function in the graphic mode. As will hereinafter be more fully described this involves the generation of appropriate signals to indicate that the system is prepared for the graphic mode and the generation of appropriate logical signals for controlling the selective actuation of the facsimile transceiver in the receiving mode. In the receiver logic the respective video, synchronizing and stop tone signals are separately employed to actuate the stylus, to establish synchronism and to generate appropriate control signal levels which are coupled to the motor control logic respectively. Similarly, the paper load AND REQUEST TO SEND CONTROL SIGNALS control the activation of the transmit logic 41. The video stream out of the receiver logic is coupled in the case of the Telecopier facsimile apparatus to the stylus amplifier 57. As is known the stylus amplifier may comprise a driver which varies a marking stylus pressure against a record sheet in accordance with the received video pulse train. The received video may comprise either a two level black-white system or in normal operation a plurality of signal levels corresponding to the grey scale capabilities of the apparatus. As shown the respective paper load switch 53 and the request to send-receive switch 55 must initially be properly positioned at the receiver to initiate the graphic mode of transmission. With the hereinbefore described loop check procedure complete, the video from the receive logic is coupled to the stylus amplifier and the record medium is controlled by the motor control logic 59. Thus the video signals control the selective actuation of the stylus thereby recreating or generating a facsimile copy of the transmitted document at the receiver.

Figure 3:
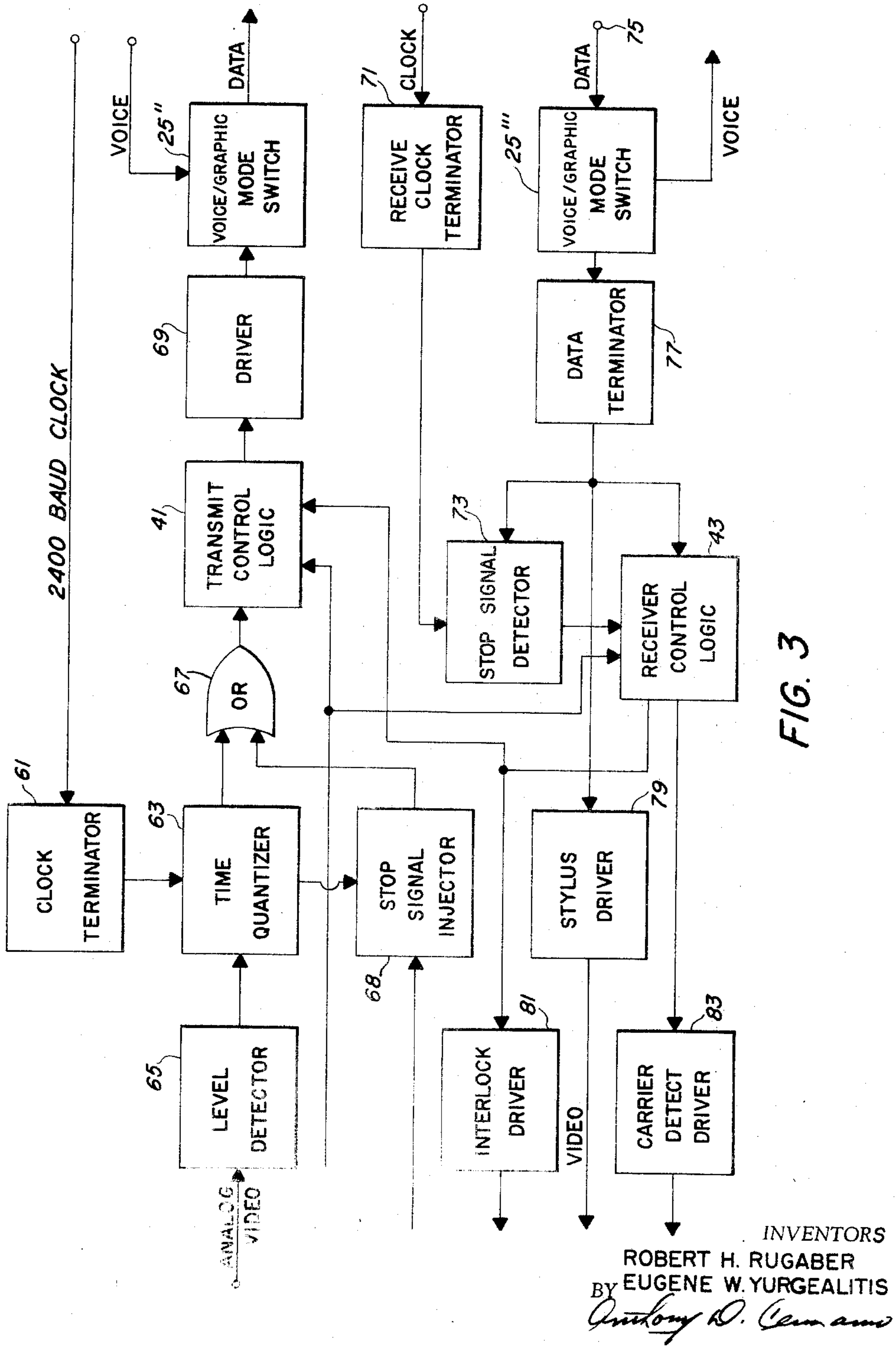
FIG. 3 is a block diagram illustrating further aspects and details of a facsimile phone interface terminal apparatus embodyng the principles of the present invention.

Referring now to FIG. 3 there is shown a block diagram of the interface logic for the combined graphic-phone interface apparatus in accordance with the principles of the present invention. As hereinbefore described in conjunction with FIG. 1 the clock signal is supplied by the modems 29 and 31 at the transmitter and receiver terminal respectively. This clock signal which for example may comprise a 2400 hertz square wave, is coupled to clock terminator and phase control apparatus 61. The clock terminator circuit includes appropriate electronic circuitry for example a transistorized amplifier stage, for shifting the logic or signal level from that of the modem unit to that compatible with the interface logic. The clock signal is coupled from the output of the clock terminator 61 to the input of the quantizer circuit 63 wherein the video signal train is time quantized, i.e., the transitions are limited to predetermined times.

In the case of the operation of the Telecopier facsimile apparatus in the two level mode, the analog signal from the transmitter video circuit of the transceiver is coupled to the input of level detector 65 wherein the two level video signal is generated by adjusting an appropriates slicing level to convert the respective analog signal excursions into black and white levels respectively. The two level video signal is coupled to the input of the quantizer circuit 63 wherein the transitions are restricted to predetermined clock times thereby resulting in a synchronous video signal train. The output of the synchronous video train is coupled to one input of OR gate 67. The other input to OR gate 67 is generated by the stop signal injector 68 (FIG. 6) which is controlled by the paper load switch. OR gate 67 couples either the quantized video train or the stop signal to the input of transmit control logic 41. Under the control of the request to send-receive switch and the paper load switch the transmit logic couples either the video signal or the stop tone signal to the encrypting apparatus via the driver 69 and voice-graphic mode switch 25 which may comprise a transistorized switching apparatus. Thereafter the video or stop tone signals are encrypted and coupled to the receiving terminal in the manner hereinbefore described.

In the receiving mode the clock terminator and phase control 71 couples a receiver clock from the modem to the stop signal detector and timer 73. The data from the decrypting circuit at the receiver is coupled from terminal 75 to the voice-graphic mode switch 25. The output of the data terminator 77, which may comprise a transistorized amplifier for converting the logic levels to insure compatibility between the respective modem and the interface logic, couples the received data stream in the graphic mode to the input of the receiver control logic 43, and the stop signal detector and timer 73. As will hereinafter be more fully explained the stop signal detector 73 monitors the data stream in the graphic mode to detect the stop signal pattern. The detection of the stop signal initially conditions the receiver logic in the receive mode. The receive logic couples the appropriate logic signals to the input of the interlock driver logic 81 and the carrier detect logic circuit 83 for controlling the facsimile apparatus. The data from the data terminator 77 is likewise coupled to the input of the stylus driver 79 which as hereinbefore described controls the selective actuation of the facsimile printer thereby generating a facsimile copy of the transmitted document.

In the two level black-white facsimile mode the stop tone signal preferably comprises an alternating pattern of binary "ones" and "zeroes" at a predetermined rate. In the case of a 2400 hertz square wave clock signal, the stop signal preferably comprises a 1200 hertz repetitive binary "one-zero" pattern. The stop tone detector 73 and stop signal injector 68 of the transmitter and receiver will be hereinafter described in further detail.

Figure 4:
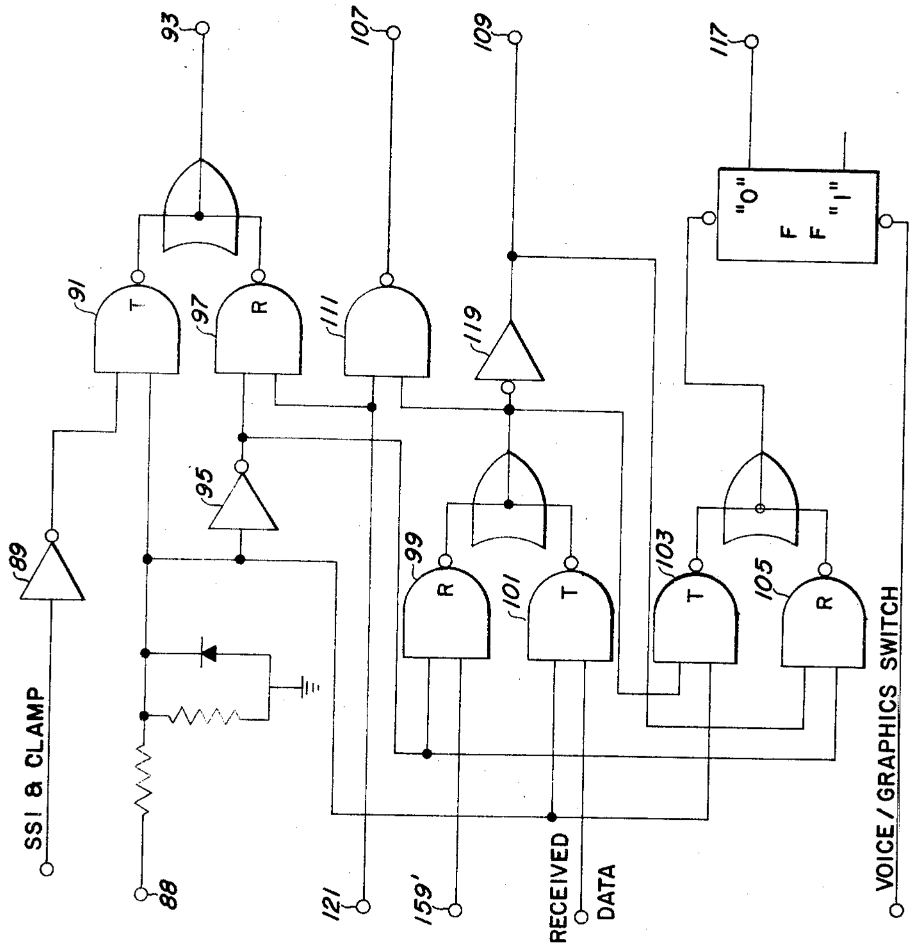
FIG. 4 is a logical diagram of the transmit-receive interface control logic embodying the principles of the present invention.

Referring now to FIG. 4 there is shown a logical diagram of the transmit-receive logic for controlling the operation of the facsimile apparatus in the combined phone-graphic communication link. As hereinbefore stated, while any facsimile apparatus may be utilized in accordance with the principles of the present invention, the preferred embodiment utilizes a Xerox Magnafax Telecopier transceiver at the respective terminals of the combined link. While the particular logic control signals, utilized to control the transceiver in the graphic mode, depend upon the particular facsimile apparatus employed, it will be recognized by those skilled in the art that considerable modifications may be made to the illustrative control logic and signals disclosed in conjunction with the preferred embodiment to accomplish equivalent control functions, depending upon the requirements of the facsimile apparatus.

In the logical diagram illustrated in FIG. 4, and the other drawings the various logical elements AND, OR and NOT, may be of any type known in the art for accomplishing the respective logical operations. It should be noted that in the preferred embodiment the AND gates connected as shown with the outputs strapped, i.e., two respective AND gate outputs tied together, accomplishes the equivalent of the logical OR function and thus a phantom or symbolic OR gate is shown at the junction of the AND gate outputs of the respective AND gate pairs.

Similarly, the flip-flop or storage elements functionally may be accomplished by any bistable device, for example, the ordinary cross-coupled Eccles-Jordan circuit having separate inputs and outputs. For simplicity of comparison of the control logic illustrated in FIG. 4 with that shown in the various figures the appropriate designation T and R has been added to the respective logical gating elements which are employed primarily in the transmit (T) and receive (R) mode respectively, while those undesignated logical elements function in both the transmit and received mode.

The video signals generated and shaped in accordance with the hereinbefore described method are coupled via inverter 89 to one input of transmit AND gate 91. The other input to transmit AND gate 91 is coupled to the request to transmit-receive switch and clamping network. Thus, with the loop in the graphic mode and the request transmit-receive switch in the appropriate condition, AND gate 91 is conditionally enabled thereby permitting the video signals coupled to the other input of the AND gate to be generated at the output thereof. The output signals from AND gate 91 are coupled from terminal 93 to the data driver and via the voice-graphic switch to the encoding circuit. With the request to transmit-receive switch in the transmit position, the logical level coupled via inverter 95 to receive AND gate 97 is logically false, thus disabling, receive AND gate 97. Similarly, the signal from the transmit-receive switch is coupled to one of the respective inputs of AND gates 99, 101, 103, and 105 thereby controlling the operation thereof. In this manner with the transmit-receive switch in the transmit position, the gates 101 and 103 which operate in the transmit mode are enabled, thereby generating the appropriate logical control signals at terminals 107 and 109 for controlling the interlock and carrier detect circuits of the facsimile transceiver and terminal 117 for controlling the stop tone injector circuit. Similarly gates 97, 99 and 105, the receive sections, are enabled or disabled depending upon the position of the transmit-receive switch to generate appropriate logic level at terminal 117 to control the operation of the stop tone injector circuit 68 of FIG. 3 and logic levels at terminals 93, 107 and 109 respectively.

With the transmit-receive switch in the receive position the logic level which is coupled to terminal 88 at the receive level, the respective transmit AND gates (T) are disabled while the corresponding receive logic gates (R) are enabled. With the receive gates (R) enabled, the timer signal coupled to the input of AND gate 99 energizes gate 99 and a level signal is coupled via inverter 119 to an output terminal 109. This signal as shown in FIG. 3 corresponds to the carrier detect signal control level and is used to control the operation of the facsimile transceiver in the receive mode. Similarly, when the AND gate 111 is enabled, by the clamp level coupled to terminal 121 and the output of AND gate 99, a logical signal level at terminal 107 corresponds to the interlock signal. In the receive mode receive gate 97 is enabled by the signal coupled to the input via inverter 95, clamp signal from terminal 121 permits the generation at terminal 93 of the reverse supervisory logical level for shifting the level on the transmission line during legitimate graphic mode operation. Thus, with the appropriate facsimile transceiver control signals generated by the control logic, the signals coupled to the stylus amplifier (FIG. 3) in response to the reception of data, the facsimile copy is generated corresponding to the received video signals.

Figure 5:
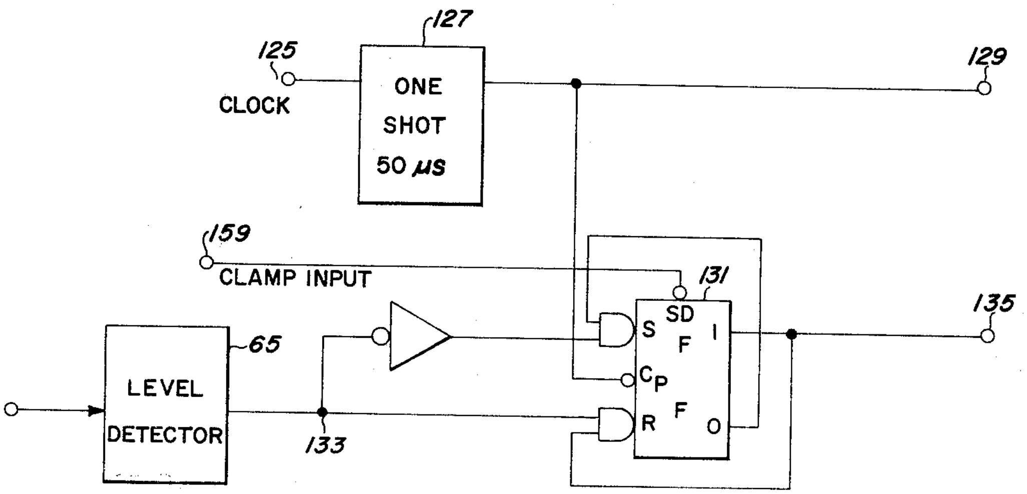
FIG. 5 is a block diagram of video quantizer circuitry utilizable in accordance with the principles of the present invention.

Referring now to FIG. 5, there is shown a logical diagram of a quantizer circuit 63 utilizable in the interface apparatus of FIG. 3 in accordance with the principles of the present invention. As hereinbefore described, the video signal generated by the facsimile transmitter, in the preferred embodiment corresponds to a multi-level analog signal corresponding to the various gray scale levels of background and information of a document along a predetermined scanning raster. In the two-level operation of the secure voice-graphic communication system in the graphic mode a two-level amplitude and time quantized video signal is generated corresponding to a predetermined slicing level to generate or denominate black and white levels corresponding to the information and background levels of the document being transmitted respectively. Functionally, the quantizer generates an amplitude and time quantized video wave train corresponding to the portions of the analog signal which are above and below any threshold respectively.

As shown in FIG. 5, the clock signal is coupled via the input terminal 125 to a one-shot multivibrator 127 which shortens the clock pulse times. These shortened pulses corresponding to the transitions in the normal clock are coupled from terminal 129 to the stop signal injector (FIG. 6) and to the toggle input of flip-flop 131. The video signal is coupled from the level detector 65 to the respective AND gate inputs of flip-flop 131 in the inverted and non-inverted form respectively. The other inputs to the flip-flop AND gates are taken from their respective logical "one" and "zero" outputs. In this configuration flip-flop 131 which may comprise a pair of parallel driven alternately active flip-flop circuits in which one of the respective outputs is shown, is conditioned to favor change. That is, the flip-flop 131 is encouraged by the feedback to assume a state different from one state if the analog signal has changed during the preceding clock time.

The output from terminal 135 of the quantizer circuit flip-flop 131 comprises the amplitude and time quantized video signal train, which in the preferred embodiment comprises a 2400 baud video train. As hereinbefore described, the video train is coupled via the voice-graphic switch (FIG. 1) to the input of the encoder circuit and thence to the input of the transmission medium.

Figure 6:
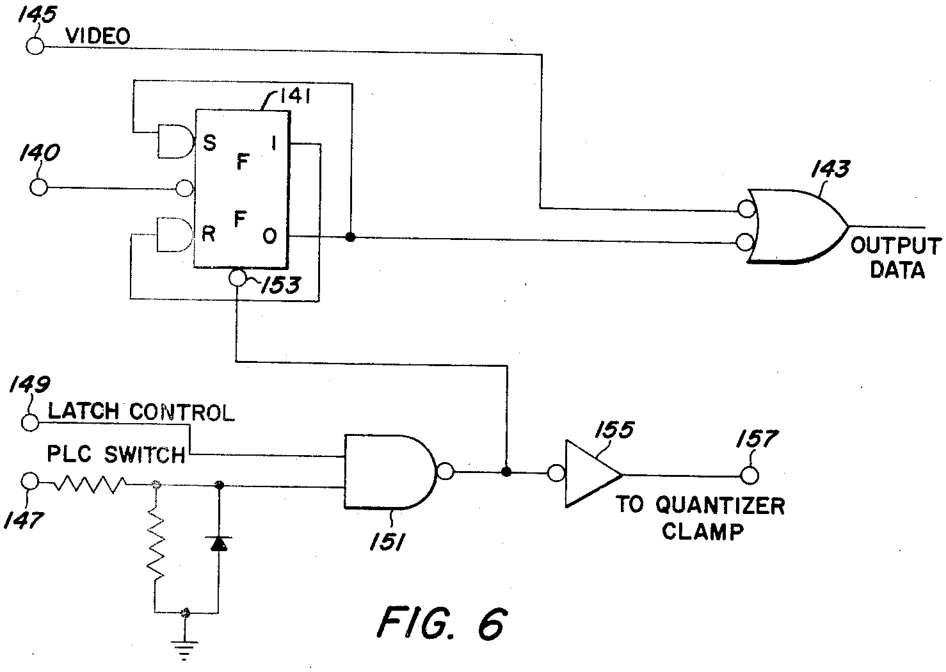
FIG. 6 is a block diagram of the stop signal injector circuit utilizable in accordance with the principles of the present invention.

Referring now to FIG. 6, there is shown a logical diagram of the stop signal injector and clamping circuit utilizable in the interface apparatus of FIG. 3 in accordance with the principles of the present invention. As was hereinbefore described, the loop check procedure precedes the initiation of the graphic mode transmission. In the loop check procedure the transmitter sends a stop tone, i.e., a unique signaling pattern to the receiver, when either no data is being transmitted or when the reverse supervisory graphic signaling signal is lost. As hereinbefore described, to insure proper transmission of graphic information, it is desirable in accordance with one aspect of the present invention to provide a reverse graphic mode signal which may comprise a DC level shift in transmission media, which is appropriately detected at the transmitter and interpreted as meaning that the loop is in proper condition for the graphic transmission mode. When the transmitter and receiver are properly prepared for graphic transmisison, i.e., when the paper load switch and transmit-receive switches are in the proper position, the receiver generates a clear-to-send signal which as hereinbefore described, may comprise a DC level shift, i.e., at terminal 93 of FIG. 4 for coupling to the transmission media. Upon receipt of the reverse supervisory clear-to-send signal, the stop tone injector is inhibited at the transmitter by the receive logic and the facsimile unit goes into the normal transmit graphic mode.

While the respective clear-to-send signal and stop tone signals may comprise any signaling pattern which may be generated and detected at the respective transmitting and receiving terminals, in accordance with the preferred embodiment of the present invention the stop tone comprises a 2400 baud, 1200 hertz, alternating pattern of binary "ones" and "zeroes" and the reverse supervisory clear-to-send signal is a DC level shift. This preferred embodiment of the stop tone is for the preferred embodiment of the combined voice-graphics link wherein the information is normally transmitted at a 2400 baud rate.

Referring now to FIG. 6, there is shown the preferred embodiment of the stop signal injector and clamping circuit. The clock from the quantizer circuit (FIG. 5) is coupled to the toggle input of the flip-flop 141 via terminal 140. The logical control gates associated with the respective halves of the flip-flop 141 are cross-coupled from the output, thus, arranging the flip-flop in an essentially center-driven toggle configuration. The output of the flip-flop is coupled to one input of OR gate 143, which selectively couples either the stop tone signal from flip-flop 141 or the quantized video signals coupled from terminal 145 to the output data path comprising the control logic and voice-graphics switch as set forth hereinabove. The control of the generation of the stop tone as hereinbefore described depends upon the proper positioning of the paper load switch which couples a suitable signal to terminal 147 and the control logic latch level coupled to terminal 149. The respective control signals are coupled to the input of AND gate 151 which generates a control signal for an override terminal 153 of flip-flop 141. As will hereinafter be more fully described, the override signal coupled to override terminal 153 inhibits the flip-flop action and locks the flip-flop 141 in the "zero" state, thus allowing video from terminal 145 to be coupled via the OR gate 143 to the output data stream. The output of AND gate 151, which controls the operation of the stop signal generating flip-flop 141 is also coupled via inverter 155 to terminal 157. This inverted output of AND gate 155 is coupled to the clamp input terminal 121 of FIG. 4 and the clamp input terminal 159 of FIG. 5 respectively.

The clamp signal coupled to the clamp terminal 121 of FIG. 4 controls the generation of control signal levels at terminals 107 and 93, which respectively control the interlock circuitry in the transceiver and the operation of the transmit logic (FIG. 3). Thus, when the stop tone is detected in the receiver, gate 99 under the control of the stop tone detector signal coupled to terminal 159 generates appropriate signals for inhibiting the operation of the receiver and enabling the operation of the transmit logic. Similarly, in the quantizer (FIG. 5) the clamp input signal overrides the video and the clock signals to inhibit the operation of video flip-flop 131.

Figure 7:
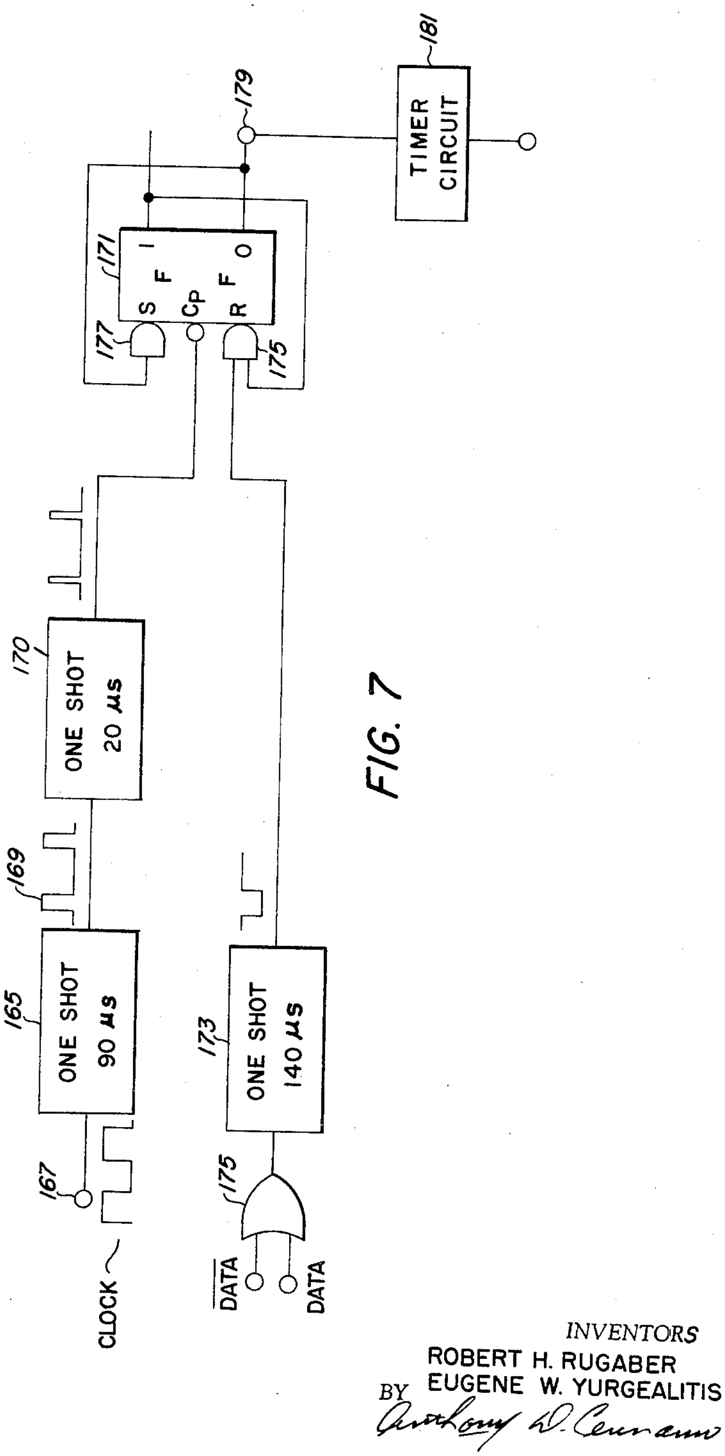
FIG. 7 is a schematic diagram of the stop tone detector utilizable in accordance with the principles of the present invention.

Referring now to FIG. 7, there is shown the preferred embodiment of the stop tone detector circuit utilizable in the interface apparatus of FIG. 3 in accordance with the principles of the present invention. Functionally, the stop tone detector is arranged to monitor the received data stream and to detect the presence of the stop tone pattern which in accordance with the preferred embodiment comprises a 2400 baud, 1200 hertz alternating binary "zero"-"one" pattern. As shown, the clock signal is coupled to the input of one shot 165 from terminal 167. In response to clock signals, delayed pulses of predetermined width, for example, in the order of 90 microseconds are generated at the output terminal of one shot 165 and this pulse is coupled to the input of cascaded one shot 170. In response to signals 169 from the first one shot 165, a pattern of narrow delayed pulses in the order of 20 microseconds is coupled from the output of one shot 170 to the trigger input of flip-flop 171.

The respective transitions in the received data stream and the transitions inverted are coupled to terminals of the input of one shot 173 via OR gate 175. In response to the transitions in the data stream, pulses of predetermind width are generated at the output of one shot 173. In the preferred embodiment the delay one shot 173 generates pulses in the order of one hundred forty microseconds. These output pulses of one shot 173 are coupled as one input to a flip-flop AND gate 175 with the other input thereto, generated by the binary or logical one side of the flip-flop 171. The gate or DC level for the other gate 177 of the flip-flop 171 is generated by the logical zero side terminal of flip-flop 171.

In the normal operation of the stop tone detector, i.e., when a random video stream corresponding to the received information and background levels of the document being transferred is received, the stop tone detector flip-flop 171 toggles, i.e., continually changes state in response to received data transitions and the delayed clock transition. In response to the reception of the alternating binary "zero"-"one" binary pattern, at the 2400 baud rate, flip-flop 171, under the control of its feedback or steering levels locks-up, thereby generating a predetermined control level at the output terminal 179. This level generated in response to the receipt and detection of the alternating stop tone pattern, is coupled to the input of a timer circuit 181 which may comprise an integrator. The integrator insures that the stop tone pattern must be detected for a pretermined time interval before the signal coupled to terminals 121, 159' and of the control logic (FIG. 4) and quantizer (FIG. 5) will reflect the detection of the legitimate stop tone.

In the foregoing there has been described a novel method and improved apparatus for operating a combined secure voice and in graphic communication link. As would be obvious to those skilled in the art, many modifications may be made in the disclosed method and apparatus without departing from the spirit of the present invention. It is, therefore, applicant's intention to be limited only by the scope of the appended claims.

What is claimed is:

1. In a communication system including a transmitting station and at least one receiving station and a communication link interconnecting said transmitting and receiving stations the combination comprising telephone means at said transmitting and receiving stations for transducing audio signals into electric signals in the transmitting mode and for transducing electric signals into audio signals in the receiving mode, facsimile transmitter means at said transmitting station for converting information on a document to be transmitted into electric video signals corresponding to the information on said document along a predetermined scanning raster, facsimile receiver means at said receiving station for generating a copy of said document in response to received facsimile signals, logical interface means for selectively controlling the operation of said communication system in either a voice or graphic communication mode and loop check means for controlling the initiation of graphic mode operation to insure that the respective transmitting and receiving stations are properly prepared prior to the initiation of graphic transmission, said loop check means comprising paper load switch means at said transmitting and receiving stations for detecting the presence of said document at the facsimile transmitter means and a record sheet at the facsimile receiver means, respectively, and send-receive switch means at said transmitting and receiving stations for enabling said facsimile transmitter means to send and said facsimile receiver means to receive, respectively, said paper load switch means and said send-receive switch means initiating said graphic communication mode.

2. The communication system defined in claim 1 additionally including cryptographic means at said transmitting station for encoding signals prior to transmission thereof and cryptographic means at receiving station for decoding received signals.

3. In a communication system including a transmitting station and a receiving station and a communication link coupling the transmitting station to said receiving station the combination comprising telephone means at said transmitting and receiving stations respectively for transducing electric signals into audio signals in the receiving mode and for transducing audio signals into electric signals in the transmitting mode, facsimile transceiver means at said transmitting and receiving stations respectively for converting information on a document to be transmitted into electric video signals in the transmitting mode and for generating a facsimile copy in response to electric video signals in the receiving mode, quantizing means for generating amplitude and time quantized signals in response to electric video signals, converter means for generating digitalized signals in response to signals from said telephone means in the transmitting mode and for generating analog signals from digitalized signals in the receiving mode, cryptographic means for encoding the output of either said converter means or said quantizing means at the transmitting station and for decoding received signals at the receiving station, logical means responsive to switch means at said transmitter and receiver for selectively coupling either the facsimile means or said telephone means to said cryptographic means at said transmitting and receiving stations respectively, graphic loop control means for initially insuring that each facsimile transceiver is properly conditioned prior to the initiation of a graphic transmission mode, wherein said graphic loop control means comprises paper load switch means at said transmitting and receiving stations for detecting the presence of said document at the facsimile transmitter means and a record sheet at the facsimile receiver means, respectively, and send-receive switch means at said transmitting and receiving stations for enabling said facsimile transmitter means to send and said facsimile receiver means to receive, respectively, said paper load switch means and said send-receive switch means initiating said graphic transmission mode.

4. The combination of claim 1 further including signal pattern generating means at said transmitting station for transmitting a stop tone signal to said receiving station, signal pattern detecting means at said receiving station for receiving said stop tone signal, said stop tone signal initiating the graphic communication mode at said facsimile transmitter and receiver means, and means at said facsimile receiver means for transmitting to said facsimile transmitter means a clear to send signal in response to the detected stop tone when said facsimile receiver means is in said graphic communication mode.

5. The combination of claim 3 further including signal pattern generating means at said transmitting station for transmitting a stop tone signal to said receiving station, signal pattern detecting means at said receiving station for receiving said stop tone signal, said stop tone signal initiating the graphic transmission mode at said facsimile transmitter and receiver means, and means at said facsimile receiver means for transmitting to said facsimile transmitter means a clear to send signal in response to the detected stop tone when said facsimile receiver means is in said graphic transmission mode.

References Cited

UNITED STATES PATENTS

| | | | |
|---|---|---|---|
| 2,401,888 | 6/1946 | Smith | 179—1.5 |
| 2,543,116 | 2/1951 | Llewellyn | 179—1.5 |
| 2,843,660 | 7/1958 | Franklin et al. | 179—4 X |
| 3,071,649 | 1/1963 | Goodall | 179—1.5 |
| 3,084,213 | 4/1963 | Lemelson | 179—4 X |
| 3,384,705 | 5/1968 | Rosen | 178—5.1 |

KATHLEEN H. CLAFFY, Primary Examiner

W. A. HELUESTINE, Assistant Examiner

U.S. Cl. X.R.

179—1.5, 4